United States Patent [19]

Bontinck et al.

[11] Patent Number: 5,541,251

[45] Date of Patent: Jul. 30, 1996

[54] AQUEOUS POLYURETHANE COMPOSITIONS

[75] Inventors: Dirk Bontinck, Evergem; Michel Tielemans, Wemmel; Jean-Marie Loutz, Brussels; André Vandersmissen, Brussels; Luc De Koninck, Brussels, all of Belgium

[73] Assignee: U C B S.A., Brussels, Belgium

[21] Appl. No.: 371,777

[22] Filed: Jan. 12, 1995

[30]     Foreign Application Priority Data

Jan. 14, 1994 [GB] United Kingdom ............ 9400663

[51] Int. Cl.$^6$ ............................................... C08F 8/30
[52] U.S. Cl. ................. 524/507; 524/501; 524/502; 524/818; 524/819; 524/832; 524/833; 524/840; 525/123
[58] Field of Search ........................ 524/501, 818, 524/502, 819, 507, 832, 840, 833; 525/123

[56]           References Cited

U.S. PATENT DOCUMENTS 5,266,322  11/1993  Myers et al. ..................... 424/401
5,371,133  12/1994  Stanley ............................ 524/457
5,414,041  5/1995   Larson ............................. 524/589

FOREIGN PATENT DOCUMENTS 0372804  6/1990   European Pat. Off. .
0457276  11/1991  European Pat. Off. .
0552469  7/1993   European Pat. Off. .
0568134  11/1993  European Pat. Off. .
471881   6/1969   Switzerland .
1161095  8/1969   United Kingdom .

*Primary Examiner*—Rachel Johnson
*Attorney, Agent, or Firm*—Wenderoth, Lind & Ponack

[57]            ABSTRACT

Aqueous selfcrosslinkable resin composition comprising an aqueous dispersion of at least one polyurethane polymer having anionic salt groups as sole chain-pendant functional group and at least one vinyl polymer having chain-pendant acetoacetoxyalkyl ester groups. A selfcrosslinking reaction between the polyurethane polymer and the vinyl polymer will take place during and/or after film formation, resulting in the formation of a polymeric film having properties not found to be those of the non-functional polymer components.

20 Claims, No Drawings

AQUEOUS POLYURETHANE COMPOSITIONS

The present invention relates to novel aqueous resin compositions and more particularly to novel aqueous self-crosslinkable resin compositions comprising an aqueous dispersion of polyurethane and vinyl polymers.

For the purposes of this invention, an "aqueous dispersion" means a dispersion of the polymers in an aqueous medium of which water is the principal component.

Aqueous resin compositions comprising aqueous polyurethane dispersions are well known for the production of surface coatings on various substrates such as wood, metal, fabrics, leather, paper and plastics, for the manufacture of printing ink binders, adhesives, and the like. These compositions are useful for the preparation of, for example, protective coatings, since polyurethane dispersions can be tailormade to yield coatings with very desirable properties such as ease of application, good adhesion, chemical resistance, abrasion resistance, gloss, toughness and excellent elasticity and durability.

Moreover, aqueous polyurethane coating compositions are particularly advantageous since, due to the absence or low content of organic solvents, these aqueous compositions have no toxic and odoriferous adverse effects on the environment. Therefore, aqueous polyurethane dispersions are becoming more and more important. However, serious drawbacks of aqueous polyurethane dispersions are their poor solvent and water resistance.

In order to improve solvent and water resistance properties and other physical properties, such as adhesion to substrates of the coatings formed from aqueous polyurethane dispersions, it has already been proposed to add to these dispersions various crosslinking agents. For example, U.S. Pat. Nos. 4,301,053 and 5,137,967 describe aqueous compositions comprising a carboxyl group-containing polyurethane and a trifunctional aziridine compound or a melamine-formaldehyde resin to achieve crosslinking. It has also been proposed in U.S. Pat. No. 4,598,121 to provide low temperature selfcrosslinkable aqueous polyurethane dispersions by incorporating hydrazide groups into the polyurethane chain and adding formaldehyde. However, the pot life of a composition containing a crosslinking agent in a polyurethane dispersion is limited to one or two days at room temperature. This means that the end-user has to add the crosslinking agent just prior to the application of the dispersion. On the other hand, the use of relatively toxic crosslinking agents such as aziridine compounds or formaldehyde is undesirable for many applications.

It has also been proposed to modify the properties of aqueous polyurethane dispersions by including vinyl or acrylic polymers therein (in this specification, by a vinyl polymer, we mean a (co)polymer obtained by the free-radical addition polymerization of at least one ethylenically unsaturated monomer). Aqueous acrylic polymer dispersions for coatings are well known for their outstanding adhesion, durability, transparency and weather resistance, but their film formation is difficult and they exhibit poor mechanical flexibility. Therefore, mixtures of aqueous polyurethane dispersions and aqueous vinyl or acrylic polymer dispersions should provide a good balance of properties at a competitive price.

Several patents describe processes wherein the vinyl polymer is formed in situ by polymerizing one or more vinyl monomers in the presence of an aqueous polyurethane dispersion. In the processes of this type, as disclosed in Belgian Patent No. 757,936 and in U.S. Pat. Nos. 4,198,330 and 4,318,833, the polyurethanes owe their water-dispersibility to the presence of anionic salt groups. European patent application No. 510,572 discloses the polymerization of a vinyl monomer simultaneously with the chain extension of the polyurethane. However, to obtain maximal performance in terms of chemical resistance and abrasion resistance, crosslinking with external crosslinking agents must still be carried out, since the mixtures are not selfcrosslinkable in that a chemical reaction between the polyurethane and the vinyl polymer does not occur.

Recently, a lot of attention has been drawn on the development of storage stable, one-component aqueous dispersions of polyurethane-acrylic graft copolymers because of their improved compatibility, weatherability and film formation behavior. For example, European patent application No. 167,188 discloses a process wherein polymerizable acrylated urethane polymer dispersions are used in an emulsion polymerization with other vinyl monomers to obtain a stable aqueous dispersion of urethane-acrylate graft copolymers. However, in this case also, to obtain maximal performance, crosslinking with external crosslinking agents must still be carried out.

U.S. Pat. No. 4,983,662 discloses aqueous coating compositions comprising a functionalized polyurethane and a functionalized vinyl polymer which are selfcrosslinkable at ambient or low temperatures. For example, a polyurethane polymer bearing hydrazine functional groups is crosslinked with a vinyl polymer bearing carbonyl functional groups via azomethine formation as produced from the reaction of a hydrazine compound with a ketonic or aldehydic carbonyl compound. Further, U.S. Pat. No. 5,288,804 discloses ambient temperature curable compositions comprising a polymer, such as a polyurethane or a vinyl polymer bearing acetoacetate functional groups, or a mixture of these polymers, and, as a crosslinking agent, an aromatic aldimine, which will react with an acetoacetate group. The process for the preparation of polyurethane polymers having chain-pendant hydrazine or acetoacetate functional groups, however, requires several supplementary steps compared to the preparation of conventional water-dispersible polyurethane polymers and is an important dissuasion for the person skilled in the art from using such a process. Moreover, no data are provided in these patents showing that the final compositions are storage stable.

From the foregoing, it will be obvious that there is still a need for aqueous polyurethane resin compositions comprising polyurethane and vinyl polymers which are selfcrosslinkable at ambient or low temperature, i.e. without the addition of external crosslinking agents or catalysts, which have a long pot life, which have a broad range of properties so as to enable the production of coatings and adhesives, the quality of which is at least equal to that of the known low temperature curable aqueous polyurethane polymer compositions and whereby, at the same time, the components of the composition, particularly the polyurethane, may be prepared by a simple manufacturing process involving cheap and readily available raw materials.

We have now discovered a new and useful class of aqueous selfcrosslinkable resin compositions which comprise polyurethane polymers having anionic salt groups as sole chain-pendant (i.e. lateral) functional groups (which are normally already present to render the polyurethane self-dispersible in water) and vinyl polymers having chain-pendant (i.e. lateral) acetoacetoxyalkyl ester functional groups, whereby selfcrosslinking is effected, at ambient or moderately elevated temperatures during and/or after film formation and which compositions further have a remarkably long pot life (i.e. more than 6 months at room temperature) and do not incorporate expensive and potentially toxic external crosslinking agents.

Thus, according to the present invention, there is provided an aqueous selfcrosslinkable resin composition which comprises an aqueous dispersion containing at least one polyurethane polymer having anionic salt groups as sole chain-pendant functional groups and at least one vinyl polymer having chain-pendant acetoacetoxyalkyl ester functional groups.

For the purpose of this invention a chain-pendant functional group means any functional group which is bonded to a carbon atom within the polymer chain and not the possible groups present at the ends of the polymer chain.

The selfcrosslinking reaction afforded by the compositions of the present invention is believed to occur through the formation of ester bonds between the acid function of the anionic salt groups of the polyurethane polymer and the chain-pendant acetoacetoxyalkyl ester groups of the vinyl polymer (transesterification via acidolysis by acyl-oxygen fission; see J.KOSKIKALLIO in "The chemistry of carboxylic acids and esters", edited by S.PATAI, (1969), 126–131) according to the following equations:

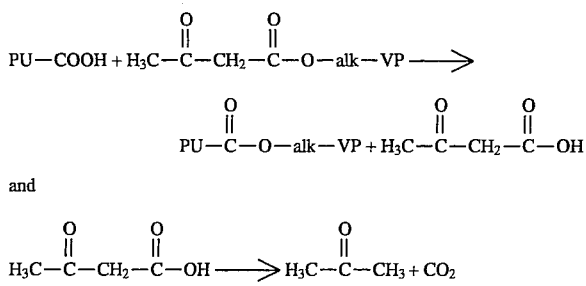

and wherein PU designates a polyurethane polymer chain, VP a polymer chain derived from vinyl monomers, and alk represents an alkylene radical (although applicant does not wish to be held to this hypothetical mechanism).

Such a selfcrosslinking reaction between the polyurethane polymer and the vinyl polymer will take place during and/or after film formation (on removal of the aqueous carrier phase) when the composition has been applied on a substrate. This results clearly in the formation of a polymeric film having properties not found to be those of the nonfunctional polymer components but showing in many instances a unique set of physical, optical and mechanical characteristics compatible with the existence of a new material. This can be deduced for instance from the presence of a single glass transition temperature (Tg) and from the remarkable values of the gel content measured after curing of the coatings for 3 days at ambient temperature.

The aqueous selfcrosslinkable resin compositions of the present invention contain the polyurethane polymer(s) and the vinyl polymer(s) preferably in a weight ratio of 1:10 to 10:1, more preferably of 1:4 to 4:1.

According to a particular embodiment of the present invention, the vinyl polymer can be prepared by radical emulsion polymerization of the monomers in the presence of the polyurethane polymer or prepolymer, or the polyurethane polymer can be prepared in the presence of the vinyl polymer (see Examples 35 and 36). This mode Of operation enables a higher solids content of the composition.

Polyurethane polymer

The polyurethane polymer component of the compositions of the present invention is a water-dispersible polyurethane polymer having chain-pendant anionic salt functional groups selected from the group consisting of the —COOM and —SO$_3$M groups, preferably the —COOM group, wherein M represents an alkali metal or an ammonium, tetraalkylammonium or tetraalkylphosphonium group.

These anionic salt groups are present in the polyurethane polymer in an amount of from 0.01 to 2 milliequivalents per gram of polyurethane polymer.

The polyurethane polymer present in the compositions of the present invention is preferably the reaction product of:
(1) an isocyanate-terminated polyurethane prepolymer formed by reacting at least
   (a) an excess of an organic polyisocyanate;
   (b) an organic compound containing at least two isocyanate-reactive groups; and
   (c) an isocyanate-reactive compound containing anionic salt functional groups (or acid groups which may be subsequently converted to such anionic salt groups); and
(2) an active hydrogen-containing chain extender.

The organic polyisocyanate used according to the present invention for the preparation of the isocyanate-terminated polyurethane prepolymer may be an aliphatic, cycloaliphatic, or aromatic polyisocyanate. As examples of suitable aliphatic diisocyanates, there may be mentioned 1,4-diisocyanatobutane, 1,6-diisocyanatohexane, 1,6-diisocyanato-2,2,4-trimethylhexane and 1,12-diisocyanatododecane either alone or in admixture. Particularly suitable cycloaliphatic diisocyanates include 1,3- and 1,4-diisocyanatocyclohexane, 2,4-diisocyanato-1-methylcyclohexane, 1,3-diisocyanato-2-methylcyclohexane, 1-isocyanato-2-(isocyanatomethyl)cyclopentane, 1,1'-methylenebis[4-isocyanatocyclohexane], 1,1'-(1-methylethylidene)bis[4-isocyanatocyclohexane], 5-isocyanato-1-isocyanatomethyl-1,3,3-trimethylcyclohexane (isophorone diisocyanate), 1,3- and 1,4-bis(isocyanatomethyl)cyclohexane, 1,1'-methylenebis[4-isocyanato-3-methylcyclohexane], 1-isocyanato-4(or 3)-isocyanatomethyl-1-methylcyclohexane either alone or in admixture. Particularly suitable aromatic diisocyanates include 1,4-diisocyanatobenzene, 1,1'-methylenebis[4-isocyanatobenzene], 2,4-diisocyanato-1-methylbenzene, 1,3-diisocyanato-2-methylbenzene, 1,5-diisocyanatonaphthalene, 1,1'-(1-methylethylidene)bis[4-isocyanatobenzene], 1,3- and 1,4-bis(1-isocyanato-1-methylethyl)benzene, either alone or in admixture. Aromatic polyisocyanates containing 3 or more isocyanate groups may also be used such as 1,1',1"-methylidynetris[4-isocyanatobenzene] and polyphenyl polymethylene polyisocyanates obtained by phosgenation of aniline/formaldehyde condensates.

The total amount of the organic polyisocyanate can be of from 10 to 60% by weight of the polyurethane polymer, preferably of from 20 to 50% by weight and more preferably of from 30 to 40% by weight.

The organic compounds containing at least two isocyanate-reactive groups used for the preparation of the isocyanate-terminated polyurethane prepolymer may be polyester polyols, polyether polyols, polycarbonate polyols, polyacetal polyols, polyesteramide polyols or polythioether polyols. The polyester polyols, polyether polyols and polycarbonate polyols are preferred. These organic compounds containing at least two isocyanate-reactive groups preferably have a number average molecular weight within the range of 400 to 5,000.

Suitable polyester polyols which may be used include the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones such as ε-caprolactone may also be included.

The polycarboxylic acids which may be used for the formation of these polyester polyols may be aliphatic, cycloaliphatic, aromatic and/or heterocyclic and they may be substituted (e.g. by halogen atoms) and saturated or unsaturated. As examples of aliphatic dicarboxylic acids, there may be mentioned, succinic acid, glutaric acid, adipic acid, suberic acid, azelaic acid, sebacic acid and dodecanedicarboxylic acid. As an example of a cycloaliphatic dicarboxylic acid, there may be mentioned hexahydrophthalic acid. Examples of aromatic dicarboxylic acids include isophthalic acid, terephthalic acid, ortho-phthalic acid, tetrachlorophthalic acids and 1,5-naphthalenedicarboxylic acid. Among the unsaturated aliphatic dicarboxylic acids which may be used, there may be mentioned fumaric acid, maleic acid, itaconic acid, citraconic acid, mesaconic acid and tetrahydrophthalic acid. Examples of tri- and tetracarboxylic acids include trimellitic acid, trimesic acid and pyromellitic acid.

The polyhydric alcohols which may be used for the preparation of the polyester polyols include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, ethylene oxide adducts or propylene oxide adducts of bisphenol A or hydrogenated bisphenol A. Triols or tetraols such as trimethylolethane, trimethylolpropane, glycerine and pentaerythritol may also be used. These polyhydric alcohols are generally used to prepare the polyester polyols by polycondensation with the above-mentioned polycarboxylic acids, but according to a particular embodiment they can also be added as such to the polyurethane prepolymer reaction mixture.

Suitable polyether polyols include polyethylene glycols, polypropylene glycols and polytetraethylene glycols.

Suitable polycarbonate polyols which may be used include the reaction products of diols such as 1,3-propanediol, 1,4-butanediol, 1,6-hexanediol, diethylene glycol, triethylene glycol or tetraethylene glycol with phosgene, with diarylcarbonates such as diphenylcarbonate or with cyclic carbonates such as ethylene and/or propylene carbonate.

Suitable polyacetal polyols which may be used include those prepared by reacting glycols such as diethyleneglycol with formaldehyde. Suitable polyacetals may also be prepared by polymerizing cyclic acetals.

The total amount of these organic compounds containing at least two isocyanate-reactive groups can be of from 30 to 90% by weight of the polyurethane polymer, preferably of from 45 to 65% by weight.

Isocyanate-reactive compounds containing anionic salt functional groups (or acid groups which may be subsequently converted to such anionic salt groups) include typically the compounds containing the dispersing anionic groups which are necessary to render the polyurethane prepolymer self-dispersible in water e.g. sulfonate salt or carboxylate salt groups. According to the invention, these compounds are preferably used as reactants for the preparation of the isocyanate-terminated polyurethane prepolymer.

The sulfonate salt groups can be introduced in this prepolymer using sulfonated polyesters obtained by the reaction of sulfonated dicarboxylic acids with one or more of the above-mentioned polyhydric alcohols, or by the reaction of sulfonated diols with one or more of the above-mentioned polycarboxylic acids. Suitable examples of sulfonated dicarboxylic acids include 5-(sodiosulfo)-isophthalic acid and sulfoisophthalic acids. Suitable examples of sulfonated diols include sodiosulfohydroquinone and 2-(sodiosulfo)-1,4-butanediol. As a variant of the process, sulfonate groups can also be incorporated during the chain extension using sulfonated diamines such as for example the sodium salt of 2,4-diamino-5-methylbenzenesulfonic acid.

The carboxylate salt groups incorporated into the isocyanate-terminated polyurethane prepolymers are derived from hydroxycarboxylic acids represented by the general formula $(HO)_xR(COOH)_y$, wherein R represents a straight or branched chain hydrocarbon radical having 1 to 12 carbon atoms, and x and y are integers from 1 to 3. Examples of these hydroxycarboxylic acids include citric acid and tartaric acid. The most preferred hydroxycarboxylic acids are the α,α-dimethylolalkanoic acids, wherein x=2 and y=1 in the above general formula, such as for example, the 2,2-dimethylolpropionic acid.

The pendant anionic salt group content of the polyurethane polymer may vary within wide limits but should be sufficient to provide the polyurethane with the required degree of water-dispersibility. Typically, the total amount of these anionic salt group-containing compounds in the polyurethane polymer can be of from 1 to 25% by weight of the polyurethane polymer, preferably of from 4 to 10% by weight.

The preparation of the isocyanate-terminated polyurethane prepolymer can be carried out in conventional manner, by reacting a stoichiometric excess of the organic polyisocyanate(s) with the organic compound(s) containing at least two isocyanate-reactive groups and the other isocyanate reactive compound(s) under substantially anhydrous conditions, at a temperature between 50° and 120° C., preferably between 70° and 95° C., until the reaction between the isocyanate groups and the isocyanate-reactive groups is substantially complete. This reaction may be facilitated by the addition of 5 to 40% by weight, preferably 10 to 20% by weight of a solvent, in order to reduce the viscosity of the propolymer if this would appear to be necessary. Suitable solvents, either alone or in admixture, are those which are unreactive with isocyanate groups such as ketones, esters and amides such as N,N-dimethylformamide, N-cyclohexylpyrrolidine and N-methylpyrrolidone. The preferred solvents are the ketones and esters with a relatively low boiling point so that they can easily be removed before, during or after the chain extension by distillation under reduced pressure. Examples of such solvents include acetone, methyl ethyl ketone, diisopropyl ketone, methyl isobutyl ketone, methyl acetate and ethyl acetate.

If desired, the preparation of the isocyanate-terminated polyurethane prepolymer may be carried out in the presence of any of the known catalysts suitable for polyurethane preparation such as amines and organometallic compounds. Examples of these catalysts include triethylenediamine, N-ethyl-morpholine, triethylamine, dibutyltin dilaurate, stannous octanoate, dioctyltin diacetate, lead octanoate, stannous oleate, dibutyltin oxide and the like.

During the preparation of the isocyanate-terminated polyurethane prepolymer the reactants are generally used in proportions corresponding to a ratio of isocyanate groups to isocyanate-reactive groups of from about 1.1:1 to about 4:1, preferably from about 1.3:1 to 3:1.

Any acid groups which may be present in the polyurethane prepolymer are converted to anionic salt groups by neutralization of said groups, before or simultaneously with the preparation of an aqueous dispersion of this prepolymer. The dispersion process of the polyurethane prepolymer is well known to those skilled in the art, and needs rapid mixing with a high shear rate type mixing head. Preferably, the polyurethane prepolymer is added to the water under vigorous agitation or, alternatively, water may be stirred into the prepolymer.

Suitable neutralizing or quaternizing agents for converting the abovementioned acid groups into anionic salt groups during or before the dispersion in water of the isocyanate-terminated polyurethane prepolymers can be volatile organic bases and/or non-volatile bases. Volatile organic bases are those whereof at least about 90% volatilize during film formation under ambient conditions, whereas non-volatile bases are those whereof at least about 95% do not volatilize during film formation under ambient conditions.

Suitable volatile organic bases can be selected from the group consisting of trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine.

Suitable non-volatile bases include those containing monovalent metals, preferably alkali metals such as lithium, sodium and potassium. These nonvolatile bases may be used in the form of inorganic or organic salts, preferably salts wherein the anions do not remain in the dispersions such as hydrides, hydroxides, carbonates and bicarbonates.

The total amount of these neutralizing agents should be calculated according to the total amount of acid groups to be neutralized. To be absolutely sure that all acid groups are neutralized in the case volatile organic bases are used, it is advisable to add the neutralizing agent in an excess of 5 to 30% by weight, preferably 10 to 20% by weight.

The aqueous polyurethane polymer dispersions may be prepared by dispersing the isocyanate-terminated polyurethane prepolymer (optionally in the form of a solution in an organic solvent) in an aqueous medium, and chain-extending the prepolymer with an active hydrogen-containing chain extender in the aqueous phase.

The active hydrogen-containing chain extender which may be used to react with the isocyanate-terminated polyurethane prepolymer is suitably a water-soluble aliphatic, alicyclic, aromatic or heterocyclic primary or secondary polyamine having up to 80, preferably up to 12 carbon atoms, or water. In the latter case, a fully reacted polyurethane polymer is obtained with no residual free isocyanate groups.

Where the chain extension of the polyurethane prepolymer is effected with a polyamine, the total amount of polyamine should be calculated according to the amount of isocyanate groups present in the polyurethane prepolymer in order to obtain a fully reacted polyurethaneurea polymer with no residual free isocyanate groups; the polyamine used in this case has an average functionality of 2 to 4, preferably 2 to 3.

The degree of non-linearity of the polyurethaneurea polymer is controlled by the functionality of the polyamine used for the chain extension. The desired functionality can be achieved by mixing polyamines with different amine functionalities. For example, a functionality of 2.5 may be achieved by using equimolar mixtures of diamines and triamines.

Examples of such chain extenders useful herein include hydrazine, ethylene diamine, piperazine, diethylene triamine, triethylene tetramine, tetraethylene pentamine, pentaethylene hexamine, N,N,N-tris(2-aminoethyl)amine, N-(2-piperazinoethyl)ethylenediamine, N,N'-bis(2-aminoethyl)piperazine, N,N,N'-tris(2-aminoethyl)ethylenediamine, N-[N-(2-aminoethyl)-2-aminoethyl]-N'-(2-aminoethyl)piperazine, N-(2-aminoethyl)-N'-(2-piperazinoethyl)ethylenediamine, N,N-bis(2-aminoethyl)-N-(2-piperazinoethyl)amine, N,N-bis(2-piperazinoethyl)amine, guanidine, melamine, N-(2-aminoethyl)-1,3-propanediamine, 3,3'-diaminobenzidine, 2,4,6-triaminopyrimidine, dipropylenetriamine, tetrapropylenepentamine, tripropylenetetramine, N,N-bis(6-aminohexyl)amine, N,N'-bis(3-aminopropyl)ethylenediamine, 2,4-bis(4'-aminobenzyl)aniline, 1,4-butanediamine, 1,6-hexanediamine, 1,8-octanediamine, 1,10-decanediamine, 2-methylpentamethylenediamine, 1,12-dodecanediamine, isophorone dismine (or 1-amino-3-aminomethyl-3,5,5-trimethyl-cyclohexane), bis(4-aminocyclohexyl)methane [or bis(aminocyclohexane-4-yl)methane], and bis(4-amino-3-methylcyclohexyl)methane [or bis(amino-2-methylcyclohexane-4-yl)methane], polyethylene amines, polyoxyethylene amines and/or polyoxypropylene amines (e.g. Jeffamines from TEXACO).

The total amount of polyamines should be calculated according to the amount of isocyanate groups present in the polyurethane prepolymer. The ratio of isocyanate groups in the prepolymer to active hydrogens in the chain extender during the chain extension is in the range of from about 1.0:0.7 to about 1.0:1.1, preferably from about 1.0:0.9 to about 1.0:1.02 on an equivalent basis.

The chain extension reaction is generally carried out at a temperature between 5° and 90° C., preferably between 20° to 50° C. When the chain extender is other than water, for example a polyamine, it may be added to the prepolymer before or after the dispersion in an aqueous medium containing the neutralizing agent for the chain-pendant acid groups. According to another embodiment, the prepolymer may be chain extended to form the polyurethane polymer while dissolved in an organic solvent, followed by the addition of water to the polymer solution until water becomes the continuous phase and the subsequent removal of the solvent by distillation to form a pure aqueous dispersion of the polyurethane polymer. Localized amine concentration gradients are preferably avoided by forming previously an aqueous solution of the polyamine used for the chain extension and adding slowly this solution to the polyurethane prepolymer dispersion.

Vinyl polymer

The vinyl polymer component of the compositions of the present invention is a vinyl polymer having chain-pendant acetoacetoxyalkyl ester functional groups. The vinyl polymer present in the compositions of the present invention is preferably the product formed by the free-radical addition polymerization of at least one monoethylenically unsaturated monomer containing an acetoacetoxyalkyl ester group with at least one other ethylenically unsaturated monomer.

Preferred monoethylenically unsaturated monomers containing an acetoacetoxyalkyl ester group are compounds having the formula R—O—CO—$CH_2$—CO—$CH_3$ wherein R represents a $CH_2$=CR'—COO—R"— group or a $CH_2$=CR'—R"— group in which R' is —H or —$CH_3$ and R" is an alkylene radical having 1 to 12 carbon atoms. The most preferred monomer of this type is acetoacetoxyethyl methacrylate.

The amount of the monoethylenically unsaturated monomer containing an acetoacetoxyalkyl ester group represents generally from about 1 to about 80% by weight, preferably from about 5 to 50% by weight of the vinyl polymer.

The other ethylenically unsaturated monomers (i.e. monomers not providing the acetoacetoxyalkyl ester functionality) which may be used for the formation of the vinyl polymer are selected from the group consisting of a) alkyl acrylates and alkyl methacrylates, the alkyl radical of which has 1 to 12 carbon atoms, such as methyl methacrylate, methyl acrylate, ethyl acrylate, butyl acrylate, 2-ethylhexyl acrylate, isooctyl acrylate, nonyl acrylate and dodecyl acrylate, b) hydroxyalkyl (meth)acrylates, the alkyl radical of which has 1 to 12 carbon atoms, c) vinyl substituted aromatic hydrocarbons such as styrene, $\alpha$-methylstyrene and the like, d) $\alpha,\beta$-ethylenically unsaturated carbonamides such as acrylamide, methacrylamide, methoxymethylacrylamide, N-methylolacrylamide and the like, e) $\alpha,\beta$-ethylenically unsaturated carboxylates having an epoxy group such as glycidyl (meth)acrylate, f) vinyl esters of aliphatic acids such as vinyl acetate, vinyl versatate and the like (versatates are esters of tertiary monocarboxylic acids having $C_9$, $C_{10}$ and $C_{11}$ chain lengths), g) vinyl chloride and vinylidene chloride, h) monoethylenically unsaturated sulfonates such as the alkali metal salts of styrene-sulfonic acid, 2-acrylamido-2-methyl-propanesulfonic acid, 2-sulfoethyl methacrylate, 3-sulfopropyl methacrylate and the like (internal surfactants).

Optionally, one of said monomers may be an $\alpha,\beta$-monoethylenically unsaturated carboxylic acid such as acrylic acid or methacrylic acid. Said $\alpha,\beta$-monoethylenically unsaturated carboxylic acid may be present in an amount of 0 to 10% by weight of the vinyl polymer. The vinyl polymers bearing chain-pendant acetoacetoxyalkyl ester groups for use in the present invention preferably have a weight average molecular weight within the range of 10,000 to 500,000, preferably of 150,000 to 300,000.

The vinyl polymer bearing acetoacetoxyalkyl ester functionality may be prepared by any suitably free-radical initiated polymerization technique.

The emulsion polymerization of the monomers may be carried out according to known methods, for example by using a semi-batch process wherein a pro-emulsion of the above-mentioned monomers is introduced into a reactor containing an aqueous solution of a free-radical initiator and heated at a constant temperature of between 60° and 95° C., preferably between 75° and 85° C., for a period of 1 to 4, preferably 2 to 3 hours to complete the reaction.

The pre-emulsion of the monomers can be prepared by adding each monomer with stirring to an aqueous solution of an emulsifier, preferably an anionic type emulsifier, such as for example lauryl sulfate, dodecylbenzenesulfonate, dodecyldiphenyloxide-disulfonate, alkylphenoxypoly(ethyleneoxy)sulfates or dialkylsulfosuccinates, wherein the alkyl radical has from 8 to 12 carbon atoms. Most preferably, a nonylphenoxypoly(ethyleneoxy)sulfate is used. It is to be understood that non-ionic emulsifiers may also be used.

Conventional free-radical initiators are used for the polymerization of the monomers, such as for example hydrogen peroxide, tert-butylhydroperoxide, alkali metal persulfates or ammonium persulfate.

Aqueous selfcrosslinkable resin composition

To prepare the aqueous selfcrosslinkable resin composition according to the present invention, the aqueous polyurethane polymer dispersion and the aqueous vinyl polymer dispersion mentioned hereinabove are mixed homogeneously at ambient temperature by any suitable mixing apparatus.

This aqueous resin composition may be advantageously employed as protective or adhesive coating composition which can be easily applied by any conventional method including brushing, spraying, knife coating, dipping or by engraving cylinders and the like to any substrate including wood, fabrics, paper, plastics, fiberboard, cardboard, glass, glass fibers, ceramics, concrete, leather, metals and the like, for industrial or domestic purposes.

The aqueous resin compositions suitably have a total solids content of from about 20 to 65% by weight, preferably from about 25 to 50% by weight, a viscosity measured at 25° C. of 50 to 5000 mPa.s, a pH value of 7 to 11, preferably 8 to 9 and an average particle size of about 10 to 1000 nanometers, preferably 50 to 300 nanometers.

After having been applied to the article in question, the deposited coatings are cured at ambient temperature for a period of 3 days, or at a higher temperature for a shorter period of time. The cured coatings thus obtained exhibit excellent adhesion, outstanding water and solvent resistance, mechanical strength, durability, flexibility and transparency.

Thus, the aqueous resin compositions of the present invention can be used for the preparation of varnishes and protective coatings, as lamination adhesives, etc., with excellent properties.

If desired, the compositions of the present invention may include other auxiliary substances (additives) which may be added to the final composition in relatively small amounts in order to impart or improve desirable properties or to suppress undesirable properties. These additives include known fillers, plasticizers, pigments, dyes, carbon black, silica sols and the known levelling agents, wetting agents, antifoaming agents, heat stabilizers, UV-light stabilizers, etc. The composition may also be blended with other polymer dispersions, for example, with polyvinyl acetate, epoxy resins, polyethylene, polystyrene, polybutadiene, polyvinyl chloride, polyacrylate and other homopolymer and copolymer dispersions.

The following Examples are given for the purpose of illustrating the present invention.

As shown in detail in the Examples, it is possible to prepare different aqueous resin compositions according to the invention by making a judicious combination of the starting materials, thus allowing the chemical, physical and technological properties of said compositions to be modified as desired, in order to adjust them to their future applications.

In these Examples, the determination of certain characteristic values was carried out in accordance with the methods described below. The isocyanate content in a reaction mixture is measured using the dibutylamine backtitration method. The free monomer content of the vinyl polymer dispersions is monitored by gas chromatography.

The viscosity ($\eta$) of the aqueous polymer dispersions is measured at 25° C. with a Brookfield RVT Viscometer, using spindle No. 1 at 50 rpm when the viscosity is under 200 mPa.s or spindle No. 2 at 50 rpm when the viscosity is higher than 200 mPa.s.

The average particle size of the aqueous polymer dispersions is measured by laser light scattering using a Malvern Particle Analyzer Processor types 7027 & 4600SM.

All the measures on the final coatings are carried out on a coating prepared with a bar coater, in order to obtain the appropriate thickness and cured for 3 days at 20° C.

The scorch test for a coating is carried out in the following manner: a 10×10 cm piece of a 100 micrometer film of the coating is placed with the middle part between two heated metal plates for 10 seconds and then evaluated for mechanical consistency. This procedure is repeated several times at increasing temperature intervals of 5°–10° C. The reported scorch temperature is the temperature at which the film no longer shows mechanical strength when taken from between the plates.

The glass transition temperature (Tg) of the different resins is measured with a Thermomechanical Analyzer 943 (DuPont Instruments) using a needle (2.54 mm diameter) with a 50 g load on a 0.5×0.5 cm piece of a 100 micrometer film and raising the temperature from −100° C. to 100° C. with a gradient of 10° C. per minute.

The ethanol resistance and water resistance of the coatings are evaluated in the following manner: a few drops of ethanol or water are applied on a 100 micrometer film of the coating and covered with a 2×2 cm cover glass. After 24 hours the cover glass is removed, excess liquid is wiped off, and the film is examined for damage, stains, whitening and loss of mechanical strength. The degree of deterioration by ethanol is reported on a scale from 1 to 5, where 5 indicates an unchanged aspect (best) while 1 means complete destruction of the film (worst). The degree of whitening by water is also reported on a scale from 1 to 5, where 5 indicates a non-whitened surface (best) while 1 means an opaque stain (worst).

The transparency of the coatings is visually evaluated on films having a thickness of 100 micrometers with a rating scale of from 1 to 7, where 1 denotes perfect transparency (best) and 7 indicates an opaque film (worst).

The methyl ethyl ketone (MEK) rub test of the coatings is effected in the following manner: a 50 micrometer film is rubbed with a cotton rag saturated with methyl ethyl ketone until the film fails (i.e. is showing through). One rub is equal to a forward and backward stroke. The reported number is the number of rubs required to break through the film.

To measure the gel content of the aqueous resin compositions, a light weight basket is immersed for 10 seconds, into the composition to be tested, dried at 20° C. during 3 days under air circulation, weighed and then immersed in methyl ethyl ketone (MEK) or N,N-dimethylformamide (DMF) for 24 hours at ambient temperature. The basket is removed from the solvent and dried at ambient temperature for 12 hours, then at 120° C. for 2 hours and then weighed again. The reported gel content is the ratio, expressed in %, of the weight of the coatings measured after 24 hours immersion in the solvent with respect to the weight of the coating measured before immersion in the solvent, i.e. the % coating weight retained on the basket after the immersion in the solvent.

In order to determine if crosslinking has occurred in the case of adhesive coatings, a 50 micrometer film of the adhesive composition is coated on various samples of silicone paper. At regular intervals of time, a film of adhesive is detached from a sample of silicone paper and soaked in N,N-dimethylformamide and the film is then evaluated for physical resistance. The crosslinking time is the time (in days) needed to develop an insoluble stable film of the adhesive.

The peel strength test for the adhesive coatings is carried out as follows: a 12 μm film of polyethylene terephthalate is coated with 4–5 g/m² of adhesive composition (using a hand coater) and is dried for 1 minute at 80° C. It is then laminated under a 5 kg load with a 12 μm film of polyethylene or with a 12 μm aluminum foil. The laminate is stored for 10 days at ambient temperature and the peel strength is then evaluated with an Instron 1122 apparatus with a traction speed of 500 mm per minute on 30×10 mm test strips of the laminate.

The storage stability of the aqueous resin compositions is determined by checking 250 g samples in white, air-tight, plastic containers every 2 weeks.

EXAMPLES 1 to 8

Preparation of aqueous polyurethane polymer dispersions.

EXAMPLE 1

830.0 g of a polycaprolactone diol (TONE 0210 Polyol from UNION CARBIDE) having a hydroxyl number of 135.2 mg KOH/g, 67.0 g of 2,2-dimethylolpropionic acid, 9.0 g of trimethylolpropane and 675.8 g of 1,3-bis(1-isocyanato-1-methylethyl)benzene are introduced into a 2-liter four-necked round-bottomed flask equipped with a mechanical stirrer, a thermometer, an air condenser, a nitrogen inlet and a dropping funnel. The mixture is heated at 85°–95° C. with stirring and 0.16 g of dibutyltin dilaurate, as catalyst, is introduced. The reaction mixture is maintained at 85°–95° C. for 4 hours. At this point the reaction mixture has an isocyanate content of 1.44 meq/g. The polyurethane prepolymer thus obtained is then cooled to 50°–60° C.

1160.0 g of demineralized water and 23.0 g of triethylamine, as the neutralizing agent, are introduced in a dispersing vessel equipped with an appropriately sized Cowles-type mixing unit and 600.0 g of the above prepared polyurethane prepolymer are added slowly at 50°–60° C. with vigorous stirring. About 5 minutes after the addition of the prepolymer is complete, 50.1 g of 2-methylpentamethylenediamine dissolved in 87.0 g of demineralized water are added dropwise into the dispersing vessel. Chain extension is complete after about 4 hours, after which an aqueous dispersion of a fully reacted polyurethaneurea is obtained. The characteristics of the obtained dispersion are given in Table I.

EXAMPLE 2

An aqueous polyurethane dispersion is prepared following the procedure of Example 1, but the starting materials are replaced with 1000.0 g of a polyester having a hydroxyl number of 56.1 mg KOH/g obtained by the polycondensation of adipic acid and 1,4-butanediol, 100.5 g of 2,2-dimethylolpropionic acid and 360.8 g of isophorone diisocyanate. 0.18 g of dibutyltin dilaurate is used as the catalyst. The reaction is stopped when an isocyanate content of 0.51 meq/g is reached and the obtained polyurethane prepolymer is allowed to cool to 50°–60° C.

37.3 g of triethylamine, as the neutralizing agent in 1500.0 g of demineralized water are introduced into a dispersing vessel equipped with an appropriately sized Cowles-type mixing unit and 600.0 g of the above prepared polyurethane prepolymer at 50°–60° C. are added slowly with vigorous stirring. About 5 minutes after the addition of the prepolymer is complete, a solution of 26.0 g of isophorone diamine in 50.0 g of demineralized water is added dropwise into the mixture. Chain extension is complete after about 4 hours, after which an aqueous dispersion of a fully reacted polyurethaneurea is obtained. The characteristics of the obtained dispersion are given in Table I.

EXAMPLE 3

512.5 g of a polypropylene glycol having a hydroxyl number of 109.5 mg KOH/g, 77.1 g of 2,2-dimethylolpropionic acid, 243.2 g of 2,4-diisocyanato-1-methylbenzene, 1.6 g of Irganox 245 from CIBA-GEIGY (triethyleneglycol-bis[3(3-tert-butyl-4-hydroxy-5-methylphenyl)-propionate]) as antioxidant and 208.2 g of N-methylpyrrolidone are introduced into a 2-liter four-necked round-bottomed flask, equipped with a thermometer, a mechanical stirrer, an air condenser, a nitrogen inlet and a dropping funnel. The mixture is heated at 70°–80° C. with stirring for 0.5 hour to complete the reaction, at which point the reaction mixture has an isocyanate content of 0.54 meq/g. 750.0 g of demineralized water and 23.5 g of triethylamine, as the neutralizing agent, are introduced into a dispersing vessel, equipped with an appropriately sized Cowles-type mixing unit and 350.0 g of the above prepared polyurethane prepolymer at 50°–60° C. are added slowly with vigorous stirring. Chain extension is carried out through hydrolysis of the isocyanate functionalities and is complete after about 2 hours, resulting in a colloidal dispersion of a fully reacted polyurethane. The characteristics of the obtained dispersion are given in Table I.

EXAMPLE 4

An aqueous polyurethane dispersion is prepared following the procedure of Example 1, except that 7.5 g of potassium hydroxide are used as the neutralizing agent in place of triethylamine. The characteristics of the aqueous polyurethane dispersion thus obtained are given in Table I.

EXAMPLE 5

384.4 g of a polypropylene glycol having a hydroxyl number of 109.5 mg KOH/g, 53.1 g of a polypropylene glycol having a hydroxyl number of 264.0 mg KOH/g, 139.2 g of 2,4-diisocyanato-1-methylbenzene and 1.6 g of Irganox 245 from CIBA-GEIGY (triethyleneglycol-bis-[3(3-tert-butyl-4-hydroxy-5-methylphenyl)-propionate]) as antioxidant is introduced into a 2-liter four-necked round-bottomed flask equipped with a mechanical stirrer, a thermometer, an air condenser, a nitrogen inlet and a dropping funnel. The mixture is heated at 60° C. for 30 minutes with stirring and then at 90° C. for 2 hours. 33.5 g of 2,2-dimethylolpropionic acid and 152.6 g of N,N-dimethylformamide are then introduced and the temperature of the mixture is maintained at 90° C. for 2 additional hours to complete the reaction. At this point, the reaction mixture has an isocyanate content of 0.11 meq/g.

15.9 g of triethylamine, as the neutralizing agent, in 1030.9 g of demineralized water are introduced into a dispersing vessel, equipped with an appropriately sized Cowles-type mixing unit and 400.0 g of the above prepared polyurethane prepolymer solution at 50°–60° C. are then added slowly with vigorous stirring. Chain extension is carried out through hydrolysis of the isocyanate functionalities and is complete after about 2 hours, resulting in a colloidal dispersion of a fully reacted polyurethane adhesive. The characteristics of the obtained dispersion are given in Table I.

EXAMPLE 6

461.3 g of a polypropylene glycol having a hydroxyl number of 109.5 mg KOH/g, 50.0 g of a polyethylene glycol having a hydroxyl number of 56.1 mg KOH/g, 9.0 g of Tercarol G310 from CARBOCHIM (addition product of 1 mole of glycerol with 3 moles of propylene oxide, having a hydroxyl number of approximately 600 mg KOH/g), 50.0 g of 2,2-dimethylolpropionic acid and 28.5 g of acetone are introduced into a 2-liter four-necked round-bottomed flask, equipped with a thermometer, a mechanical stirrer, a Liebig condenser, a nitrogen inlet and a dropping funnel. The mixture is heated at 50° C. with stirring. 198.4 g of 2,4-diisocyanato-1-methylbenzene are then added and the reaction mixture is heated at 85° C. for 4 hours to complete the reaction, then cooled at 40°–50° C. and diluted with 56.9 g of acetone. At this point, the reaction mixture has an isocyanate content of 0.56 meq/g.

450.0 g of the above prepared polyurethane prepolymer solution at 50°–60° C. are introduced into a dispersion vessel preheated at 60° C. and equipped with an appropriately sized Cowles-type mixing unit. A mixture of 29.8 g of a 15% (w/w) aqueous solution of hydrazine in water, 16.0 g of a 25% (w/w) aqueous solution of ammonia and 156.0 g of demineralized water are then slowly added. Then, again, 156.0 g of demineralized water are quickly added to obtain phase inversion, and still another 156.0 g of demineralized water are poured into the mixture to adjust the viscosity. Stirring is stopped after 30 minutes and the acetone (approximately 4% by weight of the mixture) is removed under reduced pressure while heating at 70° C. for 2 hours until a residual amount of 0.15% by weight of acetone is obtained (controlled by gas chromatography). The characteristics of the aqueous dispersion of the fully reacted polyurethane adhesive thus obtained are given in Table I.

EXAMPLE 7

345.5 g of a polyethylene glycol having a hydroxyl number of 187.0 mg KOH/g, 60.4 g of diethylene glycol, 33.0 g of trimethylolpropane, 28.8 g of 5-(sodiosulfo)-isophthalic acid and 21.0 g of demineralized water are introduced into a one-liter four-necked round-bottomed flask equipped with a thermometer, a mechanical stirrer, a distillation head, a nitrogen inlet and a dropping funnel. The mixture is heated at 80° C. for 2 hours with stirring and 115.7 g of adipic acid, 1.1 g of Fascat 4102 (a monobutyltin catalyst from M&T CHEMICALS) and 0.14 g of tris-(nonylphenyl)phosphite (stabilizer) are then added. The temperature is increased progressively to 170° C. over a period of 2 to 3 hours, during which 53.2 g of water are collected through the distillation head. A reduced pressure of 100 mm Hg is applied as the distillation rate slows down.

The resulting sulfonated polyol has a hydroxyl number of 132.0 mg KOH/g and an acid number of 2.0 mg KOH/g.

425.5 g of the above prepared sulfonated polyol, 211.1 g of 1,3-bis(1-isocyanato-1-methylethyl)benzene and 0.06 g of dibutyltin dilaurate as catalyst are introduced into another one-liter four-necked round-bottomed flask, equipped with a thermometer, a mechanical stirrer, an air condenser, a nitrogen inlet and a dropping funnel. The mixture is heated at 90° C. for 30 minutes with stirring. At this point the reaction mixture has an isocyanate content of 1.09 meq/g.

1047.6 g of demineralized water are introduced into a dispersion vessel equipped with an appropriately sized Cowles-type mixing unit and 400.0 g of the above prepared sulfonated polyurethane prepolymer are added slowly with vigorous stirring. About 5 minutes after the addition of the prepolymer is complete, a solution of 24.4 g of 2-methylpentamethylene diamine in 100.0 g of demineralized water is added slowly into the mixture. Chain extension is complete after about 4 hours, resulting in an aqueous dispersion of a fully reacted polyurethane adhesive. The characteristics of the resulting dispersion are given in Table I.

EXAMPLE 8

An aqueous polyurethane dispersion is prepared following the procedure of Example 1, but the starting materials are replaced with 400.3 g of a polycarbonate polyester (DESMOPHEN C 200 from BAYER) having a hydroxyl number of 56.0 mg KOH/g, 53.6 g of 2,2-dimethylolpropionic acid, 346.1 of isophorone diisocyanate and 200.0 g of N-methylpyrrolidone. 0.10 g of dibutyltin dilaurate is used as the catalyst. The reaction is stopped when an isocyanate content of 1.44 meq/g is reached and the obtained polyurethane prepolymer is allowed to cool to 50°–60° C.

26.7 g of triethylamine, as the neutralizing agent in 864.0 g of demineralized water are introduced into a dispersing vessel equipped with an appropriately sized Cowles-type mixing unit and 600.0 g of the above prepared polyurethane prepolymer at 50°–60° C. are added slowly with vigorous stirring. About 5 minutes after the addition of the prepolymer, a solution of 50.1 g of isophorone diamine in 50.0 g of demineralized water is added dropwise into the mixture. Chain extension is complete after about 4 hours, after which an aqueous dispersion of a fully reacted polyurethaneurea is obtained. The characteristics of the obtained dispersion are given in Table I.

An aqueous polyurethane dispersion, numbered C1, which is not according to the invention and which is introduced by way of comparison is also prepared.

EXAMPLE C1 (comparative).

830.0 g of a polycaprolactone diol (TONE 0210 Polyol from UNION CARBIDE) having a hydroxyl number of 135.2 mg KOH/g, 366.0 g of Tegomer D-3403 from Th. GOLDSCHMIDT A. G. (a polyether-1,3-diol having a hydroxyl number of 92.0 mg KOH/g and having the following formula

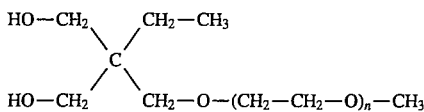

and 444.0 g of 1,3-bis(1-isocyanato-1-methylethyl)benzene are introduced into a 2-liter four-necked round-bottomed flask equipped with a thermometer, a mechanical stirrer, an air condenser, a nitrogen inlet and a dropping funnel. The mixture is heated at 85°–95° C. with stirring and 0.16 g of dibutyltin dilaurate, as catalyst, is added. The reaction mixture is maintained at 85°–95° C. for 4 hours to complete the reaction. At this point, the reaction mixture has an isocyanate content of 0.52 meq/g.

918.0 g of demineralized water are introduced into a dispersion vessel equipped with an appropriately sized Cowles-type mixing unit and 500.0 g of the above prepared polyurethane prepolymer at 50°–60° C. are introduced slowly with vigorous stirring. About 5 minutes after the addition of the prepolymer is complete, a solution of 7.8 g of ethylene diamine in 25.0 g of demineralized water are added dropwise into the dispersing vessel. Chain extension is complete after about 4 hours, resulting in an aqueous dispersion of a fully reacted polyurethaneurea; this polymer is a non-functional polyurethane polymer. The characteristics of the resulting dispersion are given in Table I.

Table I shows the solids content (in % by weight), the viscosity ($\eta$), the pH value, the average particle size (expressed in nanometers) measured for the polyurethane dispersions prepared in Examples 1 to 8 and in comparative Example C1 and the scorch temperature and glass transition temperature (Tg) of polymer films prepared therewith. These films (100 μm thickness) are obtained by casting the dispersions on glass-plates, drying them at 80° C. for 3 hours and keeping them for 2 days at ambient temperature.

TABLE I

Characteristics of the polyurethane polymers.

| | Aqueous polyurethane dispersion | | | | Dry film | |
|---|---|---|---|---|---|---|
| Example | Solids content (%) | $\eta$ (25° C.) (mPa.s) | pH | Mean particle size (nm) | Scorch temperature (°C.) | Tg (°C.) |
| 1 | 35 | 41 | 8.8 | 130 | 120 | −10 |
| 2 | 35 | 40 | 8.8 | 35 | 180 | −53 |
| 3 | 23 | 740 | 8.3 | 29 | 165 | −14 |
| 4 | 35 | 52 | 8.4 | 125 | 120 | −10 |
| 5 | 23 | 48 | 7.9 | 34 | —(2) | — |
| 6 | 45 | 580 | 6.7 | 140 | — | — |
| 7 | 27 | 360 | 8.7 | 175 | — | — |
| 8 | 35 | 62 | 7.9 | 91 | 175 | −41 |
| C1(1) | 35 | 36 | 7.2 | 79 | 105 | −38 |

(1) by way of comparison
(2) not assessed

EXAMPLES 9 to 16

Preparation of aqueous vinyl polymer dispersions.

EXAMPLE 9

28.6 g of an aqueous solution of sodium nonylphenylpoly(oxyethylene)sulfate (solids content of 34% by weight) having the formula:

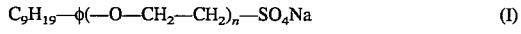

wherein $\phi$ is a paraphenylene radical and $\bar{n}=10$, 28.6 g of an aqueous solution of nonylphenoxypoly(ethyleneoxy)ethanol (solids content of 70% by weight) having the formula:

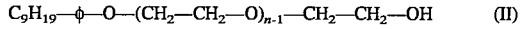

wherein $\phi$ is a paraphenylene radical and $\bar{n}=30$ and 5.0 g of the potassium salt of 3-sulfopropyl methacrylate are introduced with stirring in a tank containing 290.0 g of demineralized water. Then, 550.0 g of methyl methacrylate, 385.0 g of 2-ethylhexyl acrylate, 50.0 g of acetoacetoxyethyl methacrylate and 15.0 g of acrylic acid are added thereto with stirring, resulting in the formation of a pre-emulsion.

2.4 g of ammonium persulfate are added with stirring to a reactor containing 4.3 g of the above-mentioned aqueous solution of nonylphenylpoly(oxyethylene)sulfate (I) in 720.0 g of demineralized water heated previously up to 80° C. The pre-emulsion prepared above is then added into the resulting mixture over a period of 2.5 hours.

The reactor is maintained at 80° C. for 2 hours to complete the reaction and then allowed to cool to room temperature. 10.0 g of a 25% (w/w) aqueous solution of ammonia are added slowly thereto.

The resulting latex has a free monomer content of below 0.01% by weight (controlled by gas chromatography), an amount of particles having a size greater than 50 μm (50 μm coagulum level) which is below 50 mg/1 and a minimal film forming temperature of about 17° C. Other characteristics of the latex are given in Table II.

EXAMPLE 10

An acrylic latex is prepared following the procedure of Example 9, but 6.0 g of n-dodecyl mercaptan are added as a transfer agent after preparation of the pre-emulsion.

The resulting latex has a free monomer content of below 0.01% by weight, a 50 μm coagulum level of below 50 mg/l and a minimal film forming temperature of about 17° C. Other characteristics of the latex are given in Table II.

EXAMPLE 11

The procedure of Example 9 is followed, except that the starting materials of the pre-emulsion are replaced with 350.0 g of methyl methacrylate, 370.0 g of methyl acrylate, 150.0 g of 2-hydroxyethyl acrylate, 50.0 g of styrene, 50.0 g of acetoacetoxyethyl methacrylate and 30.0 g of methacrylic acid and 6.0 g of n-dodecyl mercaptan are added as a transfer agent after preparation of the pre-emulsion.

The resulting latex has a free monomer content of below 0.01% by weight and a 50 μm coagulum level of below 50 mg/l. This latex is diluted with 3130 g of demineralized water and subsequently neutralized with 10 g of a 25% (w/w) aqueous solution of ammonia. Other characteristics of this latex are given in Table II.

EXAMPLE 12

28.6 g of the aqueous solution of nonylphenylpoly(oxyethylene)sulfate (I) described in Example 9 are introduced with stirring in a tank containing 290.0 g of demineralized water. Then, 579.0 g of methyl methacrylate, 405.0 g of 2-ethylhexyl acrylate, 1.0 g of acetoacetoxyethyl methacrylate and 15.0 g of acrylic acid are added thereto with stirring, resulting in the formation of a pre-emulsion.

2.0 g of ammonium persulfate are added with stirring to a reactor containing 4.3 g of the aqueous solution of nonylphenylpoly(oxyethylene)sulfate (I) described in example 9 in 720.0 g of demineralized water heated previously up to 80° C. The pre-emulsion prepared above is then added into the mixture over a period of 2.5 hours.

The reactor is maintained at 80° C. for 2 hours to complete the reaction and then allowed to cool to room temperature. 10.0 g of a 25% (w/w) aqueous solution of ammonia are added slowly thereto.

The resulting latex has a free monomer content of below 0.01% by weight and a minimal film forming temperature of about 17° C. Other characteristics of the latex are given in Table II.

EXAMPLE 13

The procedure of Example 12 is followed, except that the starting materials of the pre-emulsion are replaced with 575.0 g of methyl methacrylate, 400.0 g of 2-ethylhexyl acrylate, 10.0 g of acetoacetoxyethyl methacrylate and 15.0 g of acrylic acid. The resulting latex has a free monomer content of below 0.01% by weight and a minimal film forming temperature of about 17° C. Other characteristics of the latex are given in Table II.

EXAMPLE 14

The procedure of Example 12 is followed, except that the starting materials of the pre-emulsion are replaced with 520.0 g of methyl methacrylate, 365.0 g of 2-ethylhexyl acrylate, 100.0 g of acetoacetoxyethyl methacrylate and 15.0 g of acrylic acid. The resulting latex has a free monomer content of below 0.01% by weight and a minimal film forming temperature of about 17° C. Other characteristics of the latex are given in Table II.

EXAMPLE 15

The procedure of Example 12 is followed, except that the starting materials of the pre-emulsion are replaced with 290.0 g of methyl methacrylate, 195.0 g of 2-ethylhexyl acrylate, 500.0 g of acetoacetoxyethyl methacrylate and 15.0 g of acrylic acid. The resulting latex has a free monomer content of below 0.01% by weight and a minimal film forming temperature of about 17° C. Other characteristics of the latex are given in Table II.

EXAMPLE 16

1.5 g of sodium hydroxide, 7.5 g of 2-acrylamido-2-methylpropanesulfonic acid, 11.1 g of an aqueous solution of nonylphenylpoly(oxyethylene)sulfate (I) (I but $\bar{n}=6$) having a solids content of 22.5% by weight, 35.7 g of the aqueous solution of nonylphenoxypoly(ethyleneoxy)ethanol (II) described in Example 9 and 10.0 g of isopropyl alcohol are introduced with stirring in a tank containing 600.0 g of demineralized water. Then, 650.0 g of 2-ethylhexyl acrylate, 300.0 g of methyl acrylate and 50.0 g of acetoacetoxyethyl methacrylate are added thereto with stirring, resulting in the formation of a pre-emulsion.

3.0 g of ammonium persulfate are added with stirring to a reactor containing 330.0 g of demineralized water heated previously up to 80° C. The pre-emulsion prepared above is then added into the mixture over a period of 4 hours.

The reactor is maintained at 80° C. for 2 hours to complete the reaction and then allowed to cool to room temperature. 5.5 g of a 25% (w/w) aqueous solution of ammonia are added slowly thereto. The characteristics of the resulting latex are given in Table II.

Aqueous dispersions of two vinyl polymers, numbered C2 and C3, which are not according to the invention and which are introduced by way of comparison, have also been prepared.

EXAMPLE C2 (comparative).

The procedure is identical to that described in Example 12, but the starting materials for the pre-emulsion are replaced with 575.0 g of methyl methacrylate, 410.0 g of 2-ethylhexyl acrylate, 15.0 g of acrylic acid and 28.6 g of the aqueous solution of nonylphenylpoly(oxyethylene)sulfate (I) having a solid content of 34% by weight as described in Example 9.

The resulting latex has a free monomer content of below 0.01% by weight, a 50 μm coagulum level of below 50 mg/l and a minimal film forming temperature of about 17° C. This vinyl polymer has no acetoacetoxyalkyl ester functional groups. Other characteristics of the latex are given in Table II.

Example C3 (comparative).

The procedure is identical to that described in Example 12, but the starting materials for the pre-emulsion are replaced with 550.0 g of methyl methacrylate, 385.0 g of 2-ethylhexyl acrylate, 50.0 g of diacetone acrylamide and 15.0 g of acrylic acid. The resulting latex has a free monomer content of below 0.01% by weight and a minimal film forming temperature of about 18° C. This vinyl polymer has also no acetoacetoxyalkyl ester functional groups, but bears chain-pendant carbonyl groups derived from diacetone acrylamide. Other characteristics of the latex are given in Table II.

Table II shows the solids content(in % by weight), the amount of acetoacetoxyethyl methacrylate monomer (AAEM) expressed in % by weight of the vinyl polymer, the viscosity (D), the pH value and the average particle size, measured for the vinyl polymer latex dispersions prepared in Examples 9 to 16 and in comparative Examples C2 and C3 and the scorch temperature and glass transition temperature (Tg) of polymer films prepared therewith. These films (100 μm thickness) are obtained by casting the latex dispersion on glassplates, drying them at 80° C. for 3 hours and keeping them for 2 days at ambient temperature.

TABLE II

Characteristics of the vinyl polymers.

Aqueous polyurethane dispersions

| Example | Solids content (%) | Content of AAEM (%) | η (25° C.) (mPa.s) | pH | Mean particle size (nm) | Dry film Scorch temperature (°C.) | Tg (°C.) |
|---|---|---|---|---|---|---|---|
| 9 | 49 | 5 | 315 | 8.5 | 134 | 120 | 17 |
| 10 | 49 | 5 | 408 | 8.7 | 128 | 75 | 16 |
| 11 | 20 | 5 | 80 | 8.2 | 126 | 105 | 30 |
| 12 | 49 | 0.1 | 600 | 8.6 | 129 | 120 | 26 |
| 13 | 49 | 1.0 | 450 | 8.6 | 137 | 125 | 19 |
| 14 | 49 | 10.0 | 250 | 7.6 | 122 | 130 | 23 |
| 15 | 47 | 50.0 | 150 | 6.9 | 126 | 130 | 28 |
| 16 | 50 | 5.0 | 200 | 8.4 | 208 | —(2) | —(2) |
| C2(1) | 48 | 0 | 380 | 7.2 | 125 | 135 | 15 |
| C3(1) | 49 | 0 | 460 | 8.5 | 145 | 155 | 23 |

(1)by way of comparison
(2)not assessed

EXAMPLES 17 to 36

Aqueous resin compositions according to the invention.

A series of aqueous resin compositions (Examples 17 to 34) according to the invention are prepared by mixing with stirring an aqueous polyurethane polymer dispersion prepared in Examples 1 to 8 with an aqueous vinyl polymer dispersion prepared in the Examples 9 to 16; mixing is effected until the dispersion becomes homogeneous. The different aqueous resin compositions thus obtained are used to prepare cast films having a thickness of 100 micrometers for further evaluation. Two other aqueous resin compositions (Examples 35 and 36) are prepared by polymerizing the monomers of the vinyl polymer in the presence of an aqueous polyurethane polymer dispersion (Example 35) or by chain-extending a polyurethane prepolymer with a chain extender in the presence of an aqueous vinyl polymer dispersion (Example 36).

EXAMPLE 35

The procedure of Example 9 is followed, but the mixture in the reactor, to which the pre-emulsion is added, contains in addition 2860.0 g of the aqueous polyurethane dispersion prepared in Example 1.

EXAMPLE 36

The procedure of Example 1 is followed, but the mixture introduced in the dispersing vessel and to which the polyurethane prepolymer is added, contains also 1373.0 g of the acrylic latex prepared in Example 9.

Five compositions, numbered C4 to C8, which are not according to the invention and which are introduced by way of comparison, are also prepared in the same manner as compositions of Examples 17 to 34.

The compositions of Examples 17 to 34 and $C_4$ to $C_8$ are described in the following Table III, in which the first column gives the number of the Example, the second and the third column give respectively the nature and the amount (in grams) of the aqueous polyurethane polymer (PU) dispersion used in the composition; the fourth and the fifth column give respectively the nature and the amount (in grams) of the aqueous vinyl polymer (VP) dispersion used in the composition, and the sixth column gives the polyurethane polymer (PU): vinyl polymer (VP) weight ratio.

In comparative compositions C7 and C8 a commercial polyurethane crosslinking agent is used in place of the vinyl polymer.

The aqueous compositions prepared in Examples 17 to 31, 35 and 36 are advantageously used as protective coating compositions whereas the aqueous compositions prepared in Examples 32 to 34 are intended to be used especially as adhesives.

TABLE III

Examples of aqueous resin compositions.

| Example | Polyurethane (PU) dispersion of Example | Amount (g) | Vinyl polymer (VP) dispersion of Example | Amount (g) | Weight ratio PU:PV |
|---|---|---|---|---|---|
| 17 | 1 | 58 | 15 | 42 | 1:1 |
| 18 | 1 | 58 | 14 | 42 | 1:1 |
| 19 | 1 | 58 | 10 | 42 | 1:1 |
| 20 | 1 | 58 | 13 | 42 | 1:1 |
| 21 | 1 | 58 | 12 | 42 | 1:1 |
| 22 | 1 | 58 | 9 | 42 | 1:1 |
| 23 | 1 | 41 | 9 | 59 | 1:2 |
| 24 | 1 | 26 | 9 | 74 | 1:4 |
| 25 | 2 | 62 | 9 | 38 | 1:1 |
| 26 | 3 | 68 | 9 | 32 | 1:1 |
| 27 | 4 | 58 | 9 | 42 | 1:1 |
| 28 | 1 | 50 | 11 | 87.5 | 1:1 |
| 29 | 3 | 68 | 14 | 32 | 1:1 |
| 30 | 3 | 68 | 15 | 32 | 1:1 |
| 31 | 8 | 58 | 9 | 42 | 1:1 |
| 32 | 5 | 68 | 16 | 32 | 1:1 |
| 33 | 6 | 53 | 16 | 47 | 1:1 |
| 34 | 7 | 65 | 16 | 35 | 1:1 |
| C4(1) | 1 | 58 | C2 | 42 | 1:1 |
| C5(1) | 1 | 58 | C3 | 42 | 1:1 |
| C6(1) | C1 | 58 | 9 | 42 | 1:1 |
| C7(1) | 1 | 99 | XAMA-2(2) | 1 | 35:1 |
| C8(1) | 5 | 95 | EPIKOTE 828(3) | 5 | 87:13 |

(1)by way of comparison.
(2)XAMA-2 from FLAVO CHEMIE (trimethylolpropane-tris[β-(N-aziridinyl)propionate]); (polyaziridine crosslinking agent)
(3)aqueous emulsion (65% w/w) based on EPIKOTE 828 from SHELL (a reaction product of epichlorhydrin and bisphenol A; polyepoxy crosslinking agent)

Table IV shows the scorch temperature, glass transition temperature (Tg), water and ethanol resistance and transparency measured on coatings prepared with the compositions of Examples 17 to 31, 35 and 36 (according to the invention) and with the compositions of comparative Examples C4 to C6.

All coatings from Tables IV and V are obtained by casting the aqueous resin compositions on glass-plates (50 or 100 μm thickness) and keeping them for 3 days at ambient temperature. The properties of these films could not be further improved by heating the films at 80° C., showing that full crosslinking was achieved at room temperature.

TABLE IV

Characteristics of the coatings.

| Composition of Example | Scorch temperature (°C.) | Tg (°C.) | Water resistance | Ethanol resistance | Transparency |
|---|---|---|---|---|---|
| 17 | 200 | −1 | 5 | 5 | 2 |
| 18 | 190 | 6 | 5 | 5 | 2 |
| 19 | 210 | −2 | 5 | 5 | 2–3 |
| 20 | 120 | (tail) | 5 | 5 | 3–4 |
| 21 | 120 | (tail) | 4 | 4 | 3–4 |
| 22 | 205 | 2 | 5 | 5 | 2–3 |
| 23 | 195 | 10 | 5 | 5 | 2 |
| 24 | 200 | 12 | 5 | 5 | 2 |
| 25 | 200 | −9 | 5 | 5 | 1 |
| 26 | 195 | 8 | 5 | 5 | 1 |
| 27 | 205 | 3 | 5 | 5 | 2 |
| 28 | 200 | 10 | 5 | 5 | 1–2 |
| 29 | 195 | 3 | 5 | 5 | 2 |
| 30 | 200 | −1 | 5 | 5 | 2 |
| 31 | 230 | −24 | 5 | 5 | 1–2 |
| 35 | 210 | 4 | 5 | 5 | 2–3 |
| 36 | 205 | 2 | 5 | 5 | 2–3 |
| C4(1) | 130 | −10/14 | 4 | 3 | 4 |
| C5(1) | 140 | −10/14 | 4 | 3 | 1–2 |
| C6(1) | 120 | −42/15 | 2 | 1 | 4 |

(1)by way of comparison

Table V shows the results of the MEK rub test for films (50 μm thickness) prepared with the compositions of Examples 17 to 31, 35 and 36, and with the compositions of comparative Examples C4 to C7. Table V gives also a direct comparison in this test between the coatings obtained with the complete compositions and the coatings obtained with each of the individual dispersions from which these compositions are made (see Table III). Thus, in Table V, the first column gives the Example of the composition tested, the second column shows the result of the MEK rub test (number of rubs) for the respective polyurethane polymer (PU) dispersion, the third column gives the result of the MEK rub test for the respective vinyl polymer (VP) dispersion and the fourth column gives the result of the MEK rub test for the complete composition.

TABLE V

| Composition of Example | MEK rub resistance of the coatings prepared with | | |
|---|---|---|---|
| | PU dispersion | VP dispersion | Complete composition |
| 17 | 15 | 25 | 90 |
| 18 | 15 | 15 | 80 |
| 19 | 15 | 5 | 75 |
| 20 | 15 | 10 | 4S |
| 21 | 15 | 10 | 40 |
| 22 | 15 | 10 | 75 |
| 23 | 15 | 10 | 60 |
| 24 | 15 | 10 | 70 |
| 25 | 10 | 10 | 55 |
| 26 | 10 | 10 | 65 |
| 27 | 15 | 10 | 65 |
| 28 | 15 | 5 | 110 |
| 29 | 10 | 15 | 55 |
| 30 | 10 | 25 | 60 |
| 31 | 30 | 10 | 100 |
| 35 | — | — | 75 |
| 36 | — | — | 75 |

TABLE V-continued

| Composition of Example | MEK rub resistance of the coatings prepared with | | |
|---|---|---|---|
| | PU dispersion | VP dispersion | Complete composition |
| C4(1) | 15 | 5 | 10 |
| C5(1) | 15 | 5 | 20 |
| C6(1) | 5 | 10 | 5 |
| C7(1) | 15 | — | 55 |

(1) by way of comparison

Table VI shows the results of the gel content (expressed in %) measurements in methyl ethyl ketone (MEK) and in N,N-dimethylformamide (DMF) for crosslinked coatings obtained from the aqueous resin compositions of Examples 17 to 31, 35 and 36, and from the comparative examples C4 to C7. This table gives also a direct comparison in the test between the coatings obtained with the complete compositions and those obtained with each of the individual dispersions from which these compositions are made (see Table III). Thus, in Table VI, the first column gives the Example of the composition tested, the second column gives the gel content (in MEK) for the respective polyurethane polymer (PU) dispersion, the third column gives the gel content (in MEK) for the respective vinyl polymer (VP) dispersion, the fourth column gives the gel content (in MEK) for the complete composition, the fifth column gives the gel content (in DMF) for the respective polyurethane polymer (PU) dispersion, the sixth column gives the gel content (in DMF) for the respective vinyl polymer (VP) dispersion and the seventh column gives the gel content (in DMF) for the complete composition.

TABLE VI

| Composition of Example | Gel content (in %) of the resin compositions | | | | | |
|---|---|---|---|---|---|---|
| | in MEK | | | in DMF | | |
| | PU dispersion | VP dispersion | Complete composition | PU dispersion | VP dispersion | Complete composition |
| 17 | 55 | 78 | 89 | 0 | 61 | 85 |
| 18 | 55 | 54 | 84 | 0 | 56 | 73 |
| 19 | 55 | 0 | 68 | 0 | 0 | 48 |
| 20 | 55 | 44 | 74 | 0 | 26 | 45 |
| 21 | 55 | 29 | S4 | 0 | 6 | 36 |
| 22 | 55 | 50 | 77 | 0 | 44 | S7 |
| 23 | S5 | 50 | 74 | 0 | 44 | 53 |
| 24 | 55 | 50 | 71 | 0 | 44 | 50 |
| 25 | 0 | 50 | 65 | 11 | 44 | 60 |
| 26 | 56 | 50 | 72 | 53 | 44 | 71 |
| 27 | 25 | 50 | 66 | 10 | 44 | 51 |
| 28 | 55 | 0 | 71 | 0 | 0 | 58 |
| 29 | 56 | 54 | 60 | 53 | 56 | 64 |
| 30 | 56 | 78 | 70 | 53 | 61 | 66 |
| 31 | 70 | 50 | 91 | 31 | 44 | 86 |
| 35 | — | — | 80 | — | — | 61 |
| 36 | — | — | 74 | — | — | 58 |
| C4(1) | 55 | 1 | 16 | 0 | 0 | 2 |
| C5(1) | 55 | 0 | 28 | 0 | 0 | 0 |
| C6(1) | 0 | 50 | 31 | 0 | 44 | 28 |
| C7(1) | 55 | — | 82 | 0 | — | 69 |

(1) by way of comparison

Conclusions

It can be seen from Tables IV to VI that the coatings formed from the aqueous resin compositions according to the invention have markedly improved solvent and water resistance and excellent transparency in comparison to the coatings formed from the comparative compositions containing vinyl (or acrylic) polymers which have no acetoacetoxyalkyl ester groups (comparative Examples C4 and C5) or containing a non-functional polyurethane polymer (comparative Example C6).

In the compositions of Examples 17 to 21 the polyurethane polymer is identical and the PU:VP ratio remains constant (Table III) but the content of acetoacetoxyethyl methacrylate (AAEM) of the vinyl polymer decreases from 50% to 0.1% by weight (see Table II). It can be seen that the amount of AAEM can vary within wide limits without significantly affecting the properties of the coatings i.e. scorch temperature, water and ethanol resistance, methyl ethyl ketone (MEK) rub resistance, transparency and gel content.

In Example 21 where the proportion of AAEM is particularly low (0.1% by weight), the properties of the coating are not so valuable and approach the acceptable limit. Nevertheless, the coating prepared with the composition of Example 21, which is not a preferred composition according to the invention, has still advantageous properties such as the MEK rub resistance and the gel content in comparison to the coatings obtained from the comparative compositions in which the vinyl polymer has no acetoacetoxyalkyl ester group (Examples C4 and C5).

In Examples 22 to 24, the polymer constituents of the compositions are the same, but their proportions are different. From these Examples, it can be seen that the weight ratio of the polyurethane polymer to the vinyl polymer can vary to a large extent without affecting the properties of the coatings.

Examples 25 to 31 illustrate aqueous resin compositions according to the invention made from various acrylic and polyurethane dispersions, differing from each other in the nature and in the proportions of the constituents. Examples 35 and 36 illustrate aqueous resin compositions prepared by polymerizing the monomers of the vinyl polymer in the presence of an aqueous polyurethane polymer dispersion or by chain-extending a polyurethane prepolymer with a chain extender in the presence of an aqueous vinyl dispersion.

Coatings produced from these compositions exhibit all superior properties in comparison to coatings produced from the compositions of the comparative Examples C4 to C6.

It is further to be noted that only the coatings prepared with the compositions according to the invention exhibit one glass transition temperature (Tg, Table IV), whereas the coatings prepared with the compositions of comparative Examples C4 to C6 exhibit two glass transition temperatures (Tg, Table IV).

As regards these two Tg values, it is interesting to point out that the lower value is the Tg of the polyurethane polymer of Example 1 (or C1) (see Table I), whereas the upper values are similar to the Tg of the vinyl polymer of Example C2 (or C3 or 9) (see Table II).

It is clear that a selfcrosslinking reaction does occur with the compositions according to the invention but is non-existent with the comparative compositions. This fact is confirmed by the values of the gel content (which is an indication of the level of crosslinking between the two components of the composition) measured with these compositions (Table VI). The comparative Examples clearly demonstrate that no crosslinking occurs when use is made of a vinyl polymer having no acetoacetoxyalkyl ester groups (Examples C4 and C5) or of a polyurethane polymer having no anionic salt groups (Example C6). Very interesting in this context are the high values of the gel content measured in DMF for the compositions of Examples 19 and 28 (Table VI) when compared with the zero values of the gel content for the polyurethane polymer (PU) dispersion and the vinyl polymer (VP) dispersion from which these compositions are made.

On the other hand, the values of the gel content of the coatings obtained with the compositions according to the present invention are of the same order of magnitude as the values obtained with a coating prepared from the composition of comparative Example C7, wherein an external polyaziridine crosslinking is present (see Table VI).

Examples 32 to 34 illustrate the preparation of lamination adhesives from aqueous compositions according to the invention.

Table VII shows the crosslinking time measured for adhesive coatings (50 μm thickness) and the peel strength measured for adhesive coatings (5 μm thickness) prepared with the compositions of the Examples 30 to 32 compared with the values obtained for adhesive coatings prepared from compositions containing only one of the components i.e. the aqueous polyurethane dispersion of Example 5 and the aqueous vinyl polymer dispersion of Example 16. The values obtained with an adhesive coating prepared from comparative composition C8 which contains a commercial external crosslinking agent (see Table III) is also included for comparison purposes. This composition C8 has a pot life of less than one day at room temperature.

TABLE VII

Crosslinking time and peel strength of adhesive coatings.

| Composition of Example | Crosslinking time (DMF) (days) | Peel strength (PET/PE)(2) (g/cm) | Peel strength (PET/Alu)(3) (g/cm) |
|---|---|---|---|
| 32 | 10 | 110 | 150 |
| 33 | 14 | 110 | 210 |
| 34 | 14 | 110 | 130 |
| 5(1) | >30 | 75 | 80 |
| 16(1) | >30 | 60 | 50 |
| C8(1) | 10 | 120 | 140 |

(1)by way of comparison.
(2)polyethylene terephthalate - polyethylene laminate
(3)polyethylene terephthalate - aluminum foil laminate Table VII shows that the lamination adhesives prepared with the compositions according to the present invention have superior properties compared to those of the dispersions of Examples 5 and 16 containing a polyurethane or vinyl polymer alone from which the composition of Example 32 is made (see Table III).

Finally, as far as the storage stability is concerned, it is worth noticing that the aqueous resin compositions according to the present invention did not show sedimentation, phase separation or any other sign of instability during more than 6 months storage at room temperature.

What is claimed is:

1. An aqueous selfcrosslinkable resin composition which comprises an aqueous dispersion containing at least one polyurethane polymer having anionic salt groups as sole chain-pendant functional groups and which is the reaction product of (I) an isocyanate-terminated polyurethane prepolymer and (II) an active hydrogen-containing chain extender selected from the group consisting of water and aliphatic, alicyclic, aromatic or heterocyclic primary or secondary polyamines having up to 80 carbon atoms and at least one vinyl polymer having chain-pendant acetoacetoxyalkyl ester functional groups.

2. A composition according to claim 1, wherein said at least one polyurethane polymer has chain-pendant anionic salt functional groups selected from the group consisting of the —COOM and —SO₃M groups, wherein M represents an alkali metal or an ammonium, tetraalkylammonium or tetraalkylphosphonium group.

3. A composition according to claim 1, wherein the weight ratio of said at least one polyurethane polymer to said at least one vinyl polymer is within the range of from 1:10 to 10:1.

4. A composition according to claim 1, wherein the weight ratio of said at least one polyurethane polymer to said at least one vinyl polymer is within the range of from 1:4 to 4:1.

5. A composition according to claim 1 wherein said isocyanate-terminated polyurethane prepolymer (I) is formed by reacting at least
(a) an excess of an organic polyisocyanate;
(b) an organic compound containing at least two isocyanate-reactive groups; and
(c) an isocyanate-reactive compound containing anionic salt functional groups (or acid groups which may be subsequently converted to such anionic salt groups).

6. A composition according to claim 5 wherein the organic polyisocyanate is an aliphatic, cycloaliphatic or aromatic polyisocyanate.

7. A composition according to claim 5, wherein the organic compound containing at least two isocyanate-reactive groups is selected from group consisting of polyester polyols, polyether polyols, polycarbonate polyols, polyacetal polyols, polyesteramide polyols and polythioether polyols.

8. A composition according to claim 5, wherein the isocyanate-reactive compound containing the functional anionic salt functional groups (or acid groups which may be subsequently converted to such anionic salt groups) is (a) a hydroxycarboxylic acid represented by the general formula $(HO)_xR(COOH)_y$, wherein R represents a straight or branched chain hydrocarbon radical having 1 to 12 carbon atoms, and x and y are integers from 1 to 3 or (b) a sulfonated polyester obtained by the reaction of a sulfonated dicarboxylic acid with one or more polyhydric alcohols, or by the reaction of a sulfonated diol with one or more polycarboxylic acids.

9. A composition according to claim 1, wherein the amount of anionic salt groups in the polyurethane polymer represents from 0.01 to 2 milliequivalents per gram of polyurethane polymer.

10. A composition according to claim 1, wherein said at least one vinyl polymer having chain-pendant acetoacetoxyalkyl ester functional groups is the product formed by the free-radical addition polymerization of at least one monoethylenically unsaturated monomer containing an acetoacetoxyalkyl ester group with at least one other ethylenically unsaturated monomer.

11. A composition according to claim 10, wherein the monoethylenically unsaturated monomer containing an acetoacetoxyalkyl ester group is a compound having the formula

R—O—CO—CH₂—CO—CH₃ wherein R represents a
CH₂=CR'—COO—R"— group or a CH₂=CR'—R"— group in which

R' is a hydrogen atom or a methyl radical and
R" is an alkylene radical having 1 to 12 carbon atoms.

12. A composition according to claim 10, wherein the monoethylenically unsaturated monomer containing an acetoacetoxyalkyl ester group is acetoacetoxyethyl methacrylate.

13. A composition according to claim 10, wherein the monoethylenically unsaturated monomer containing an acetoacetoxyalkyl ester group is present in an amount of from about 1 to about 80% by weight of the vinyl polymer.

14. A composition according to claim 10, wherein the monoethylenically unsaturated monomer containing an acetoacetoxyalkyl ester group is present in an amount of from about 5 to 50% by weight of the vinyl polymer.

15. A process for the preparation of an aqueous self-crosslinkable resin composition according to claim 1, which comprises homogenously mixing together at room temperature an aqueous dispersion of at least one polyurethane polymer having anionic salt groups as the sole chain-pendant functional groups and which is the reaction product of
(I) an isocyanate-terminated polyurethane prepolymer and
(II) an active hydrogen-containing chain extender selected from the group consisting of water and aliphatic, alicyclic, aromatic or heterocyclic primary or secondary polyamines having up to 80 carbon atoms,
and an aqueous dispersion of at least one vinyl polymer having chain-pendant acetoacetoxyalkyl ester functional groups.

16. A process for the preparation of an aqueous self-crosslinkable resin composition according to claim 1, which comprises subjecting the monomers of the vinyl polymer having chain-pendant acetoacetoxyalkyl ester functional groups to radical polymerisation in the presence of an aqueous polyurethane polymer having chain-pendant anionic salt functional groups and which is the reaction product of
(I) an isocyanate-terminated polyurethane prepolymer and
(II) an active hydrogen containing chain extender selected from the group consisting of water and aliphatic, alicyclic, aromatic or heterocyclic primary or secondary polyamines having up to 80 carbon atoms
or subjecting an isocyanate-terminated polyurethane prepolymer having chain-pendant anionic salt functional groups to chain-extension with an active hydrogen-containing chain-extender selected from the group consisting of water and aliphatic, alicyclic, aromatic or heterocyclic primary or secondary polyamines having up to 80 carbon atoms, in the presence of an aqueous dispersion of a vinyl polymer having chain-pendant acetoacetoxyalkyl ester functional groups.

17. A varnish, protective or adhesive coating obtained with an aqueous composition according to claim 1.

18. A composition according to claim 2, wherein the weight ratio of said at least one polyurethane polymer to said at least one vinyl polymer is within the range of from 1:10 to 10:1.

19. A composition according to claim 2, wherein the weight ratio of said at least one polyurethane polymer to said at least one vinyl polymer is within the range of from 1:4 to 4:1.

20. A composition according to claim 11, wherein the monoethylenically unsaturated monomer containing an acetoacetoxyalkyl ester group is acetoacetoxyethyl methacrylate.

* * * * *